April 9, 1935. W. H. NICHOLS 1,997,227
ROTOR CUTTING MACHINE
Filed July 22, 1932 4 Sheets-Sheet 2
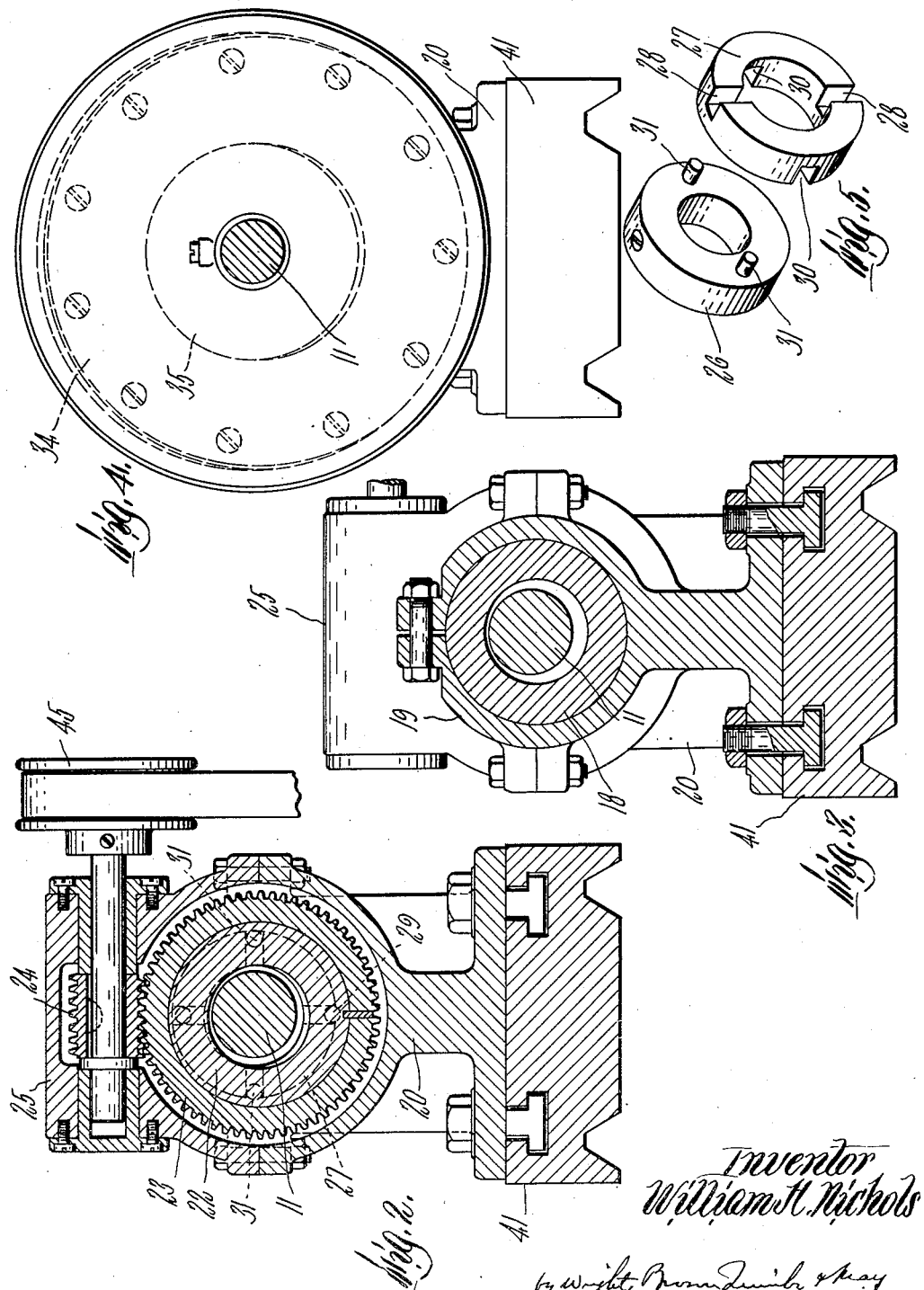
Inventor
William H. Nichols
by Wright, Brown, Quinby & May
Attys.

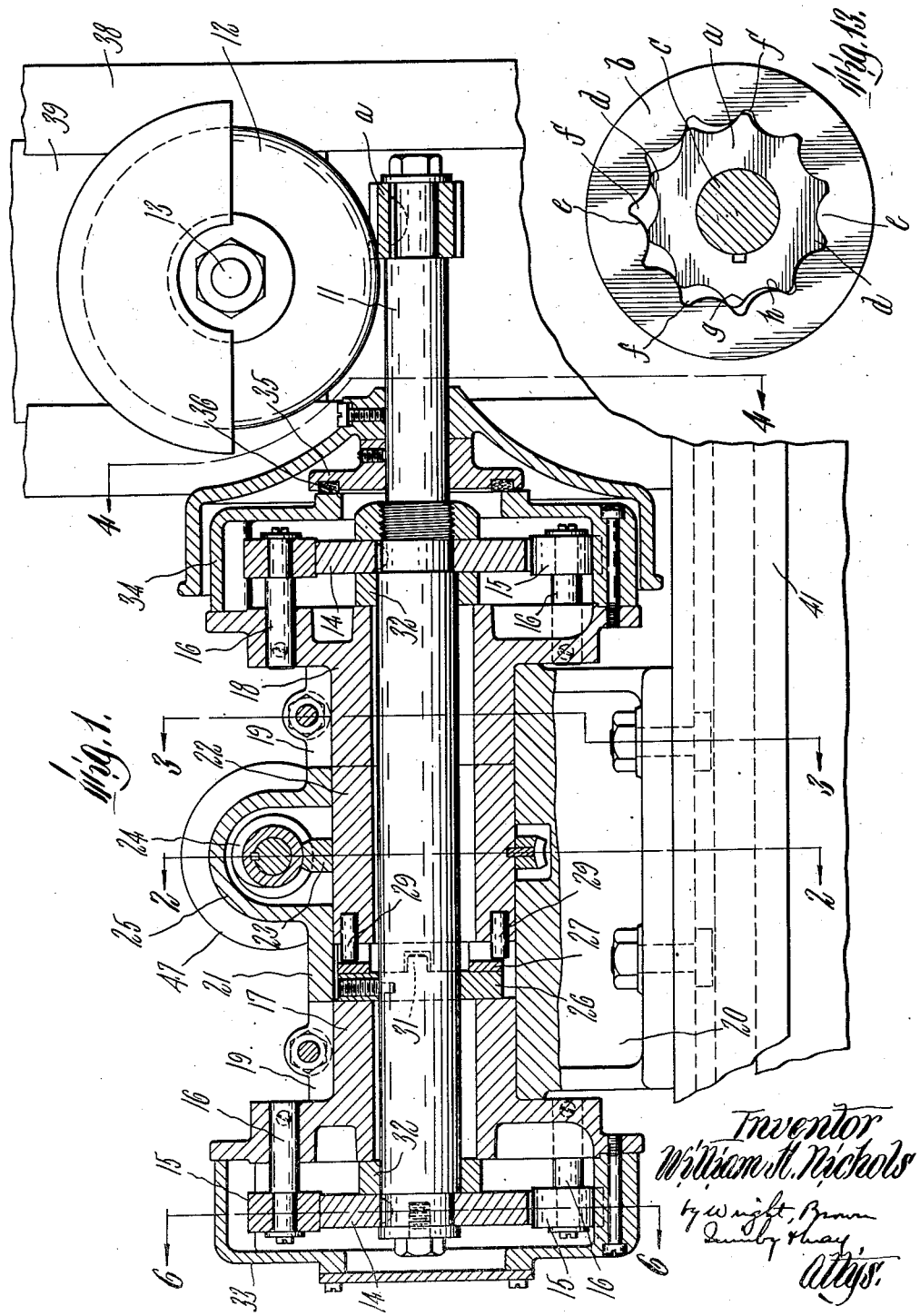

April 9, 1935. W. H. NICHOLS 1,997,227
ROTOR CUTTING MACHINE
Filed July 22, 1932 4 Sheets-Sheet 3
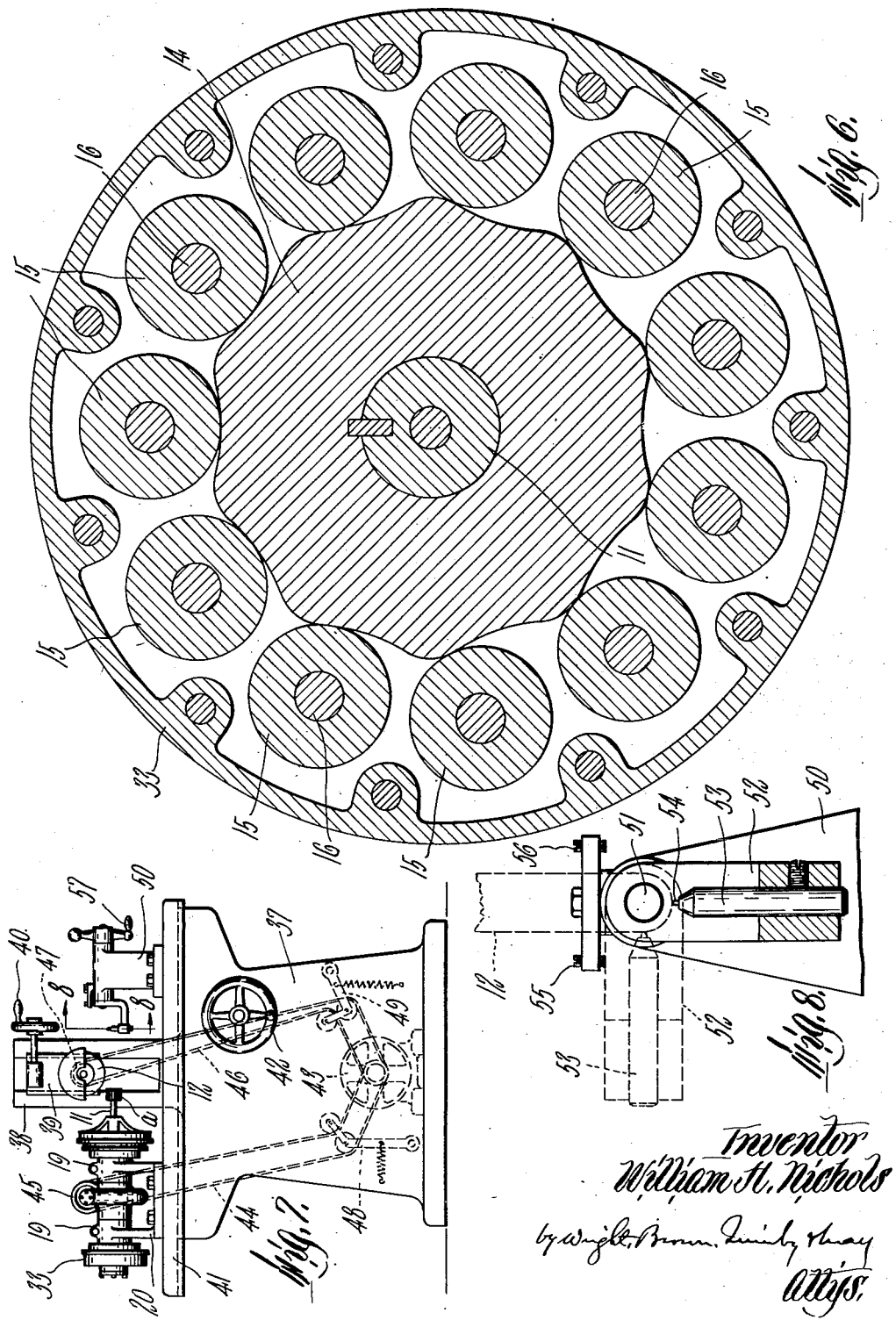

April 9, 1935.  W. H. NICHOLS  1,997,227
ROTOR CUTTING MACHINE
Filed July 22, 1932  4 Sheets-Sheet 4
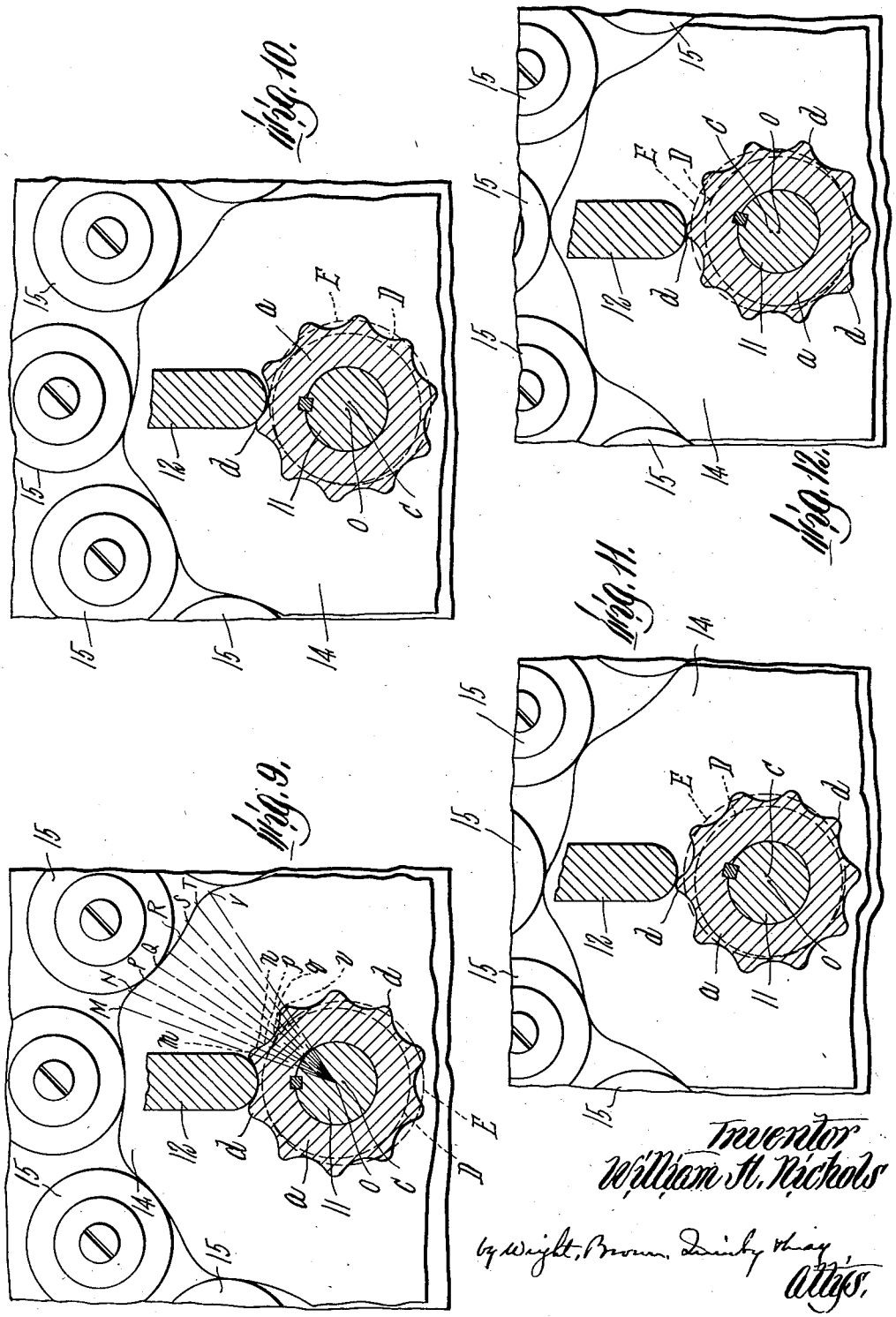

Patented Apr. 9, 1935

1,997,227

UNITED STATES PATENT OFFICE 1,997,227

ROTOR CUTTING MACHINE

William H. Nichols, Waltham, Mass.

Application July 22, 1932, Serial No. 624,013

12 Claims. (Cl. 51—95)

The present invention relates to means or apparatus for cutting and generating to a prescribed form at the periphery rotatable machine elements of irregular outline. I use the term "machine element" here in a broad sense to include the rotors of rotary pumps or motors and the like, as well as elements in the nature of cams which perform their functions through engagement with another machine element. The object has been to produce a machine by which a multi-lobed element of the character above indicated may be cut or finished with precision and accuracy as to its dimensions and form. A more particular object has been to enable the internal rotors of rotary pumps or compressors of the type known commercially as "Gerotors" to be produced in quantities and with such precision as to enable any of them to be used interchangeably with conjugate outer rotors. Compressors of the "Gerotor" type consist essentially of an outer ring having a number of identical lobes in its inner circumference equally spaced from one another and equidistant from the center of the ring; and an inner rotor having a number of lobes which is either one less or one more than the lobes of the outer ring, equally spaced apart and equidistant from the center of the rotor, and of conjugate form to the lobes of the ring. A condition of these conjugate rotors is that when one is placed within the other with its axis eccentric to the axis of the outer rotor by a prescribed amount, and both are rotated about their respective axes, their lobes will mesh after the order of gear teeth at one side, and be in contact with one another at the other side of their centers, and that each lobe of either rotor will remain in constant sliding contact with a lobe of the other in passing from any position of full mesh to the next such position. A part of my object has been to enable such inner rotors to be produced in the normal operation of the machine with such accuracy that it will fit in the outer rotor or ring, (produced by other methods with corresponding accuracy), and will run smoothly in substantially leakage tight contact with the outer rotor, without necessity of, any preliminary burnishing or running in operation of finishing.

The embodiment of the invention shown and described herein has been devised with that particular object in view. It has also been designed as a grinding machine in which the operating tool is a grinding wheel designed to finish to the desired precision and accuracy work pieces which have been previously cut or roughed out to approximate size and form by any suitable means. However, the principles of the invention are applicable for producing other articles of the same general type; i. e., any machine elements of irregular outline which are capable of being cut to form by rotary generation, with the aid of appropriately formed cutting tools of other types than grinding wheels.

The invention consists in the principles and equivalents, as well as the specific combination, sub-combinations, details and construction, of the machine herein illustrated as a concrete embodiment.

In the drawings,—

Fig. 1 is a sectional view of the operating parts of the specific machine above referred to, taken along the axis of the work spindle;

Figs. 2 and 3 are cross sections taken on lines 2—2 and 3—3, respectively, of Fig. 1;

Fig. 4 is a right hand elevation of so much of the machine as appears at the left of the line 4—4 of Fig. 1;

Fig. 5 is a detail perspective view of the coupling by which the work spindle is driven;

Fig. 6 is a cross section on line 6—6 of Fig. 1;

Fig. 7 is a front elevation on a reduced scale of a complete machine containing the instruments shown in the preceding views;

Fig. 8 is an elevation and partial section on line 8—8 of the truing means for the grinding wheel;

Figs. 9, 10, 11 and 12 are diagrammatic sectional elevations showing different positions taken by the work in the course of grinding from the bottom of an interlobal space to the tip of the adjacent lobe;

Fig. 13 is an elevation of the two cooperating rotors of a "Gerotor" pump, for girnding the inner one of which the machine has been designed.

Like reference characters designate the same parts wherever they occur in all the figures.

Referring to Fig. 13, sheet 1, $a$ represents the inner rotor, and $b$ the outer rotor or ring of a "Gerotor" pump. The inner rotor is keyed to a drive shaft $c$, about the axis of which it rotates, and the ring rotates about an eccentric axis in a bearing provided in the pump casing. The inner rotor has a number of external lobes $d$, in this instance 10, and the ring has a number differing by 1, (in this case 11), of internal lobes $e$, the lobes of the two members being so shaped and dimensioned, conjugate to one another, as to act in the manner of gear teeth in transmitting rotation from one to the other, and to maintain constant sliding contact in passing from one interlobal space to the next in the course of their rotation. These spaces $f, f$ between adjacent lobes of the two rotors are thus alternately enlarged and contracted whereby they are enabled to draw in and expel fluid through ports suitably located in the pump casing.

My problem, solved by the present invention, has been cut and finish the periphery of the inner rotor with exact accuracy of dimensions and form conjugate to the outer ring, by means enabling the rotors to be produced commercially in large quantities and as exact duplicates of one another within exceedingly narrow limits of tolerance. This is one phase of the whole problem of making both rotors of equal accuracy and conformity with established standards, and of determining the conjugate curves of the two rotors with such values as will enable one to drive the other efficiently when their lobes are in and near the position of full mesh while maintaining a smooth sliding contact in passing between different relative positions of full mesh. My solutions of the other phases of the major problem are described and claimed in my other applications for patent.

I have simplified the problem by making the lobes $e$ of the outer rotor as segments of equal circles located with their centers all equidistant from the center of the rotor and spaced equally apart from one another by a distance greater than their diameter. The distance apart of these lobe centers, and the eccentricity of the two rotors are made such that the driving thrust in the full mesh position of the respective lobes is delivered efficiently. At the same time it is important that the lobes $d$ of the inner rotor have sufficient width at their outer extremities to maintain with the complemental lobes a good seal for the fluid entrapped in the spaces $f, f$. Considerable latitude in these values is possible within the scope of the invention. I may say by way of illustration, but not of limitation, that in the particular unit shown here, the eccentricity of the rotors is .065″, the radius of the lobes $e$ of the outer ring is exactly .250″, and the distance of their centers from the center of the ring is exactly 1.000″. In manufacture these values are held within tolerance limits of the order of one ten-thousandth of an inch.

In producing inner rotors for this assemblage, the work piece $a$ is mounted on a spindle 11 and is revolved in a path having a definite relationship to the prescribed outline of the rotor, with reference to a cutting tool 12 which has a form bearing a prescribed relation to that of the lobes of the outer rotor. When the cutting tool, as in this illustration, is a grinding wheel designed to finish previously roughed out rotors to final form and dimensions, its circumference is given a convex toric curvature exactly corresponding to the curvature of the lobes $e$, and it is rotated by a shaft 13 on an axis transverse to the axis of the work spindle, while its median plane coincides with the mean position of the axis of the work spindle. The movement given to the work spindle 11 is a compound movement of rotation and lateral translation, the translative component of which is preferably effected by cams 14, 14 secured to the spindle and reacting against roller abutments 15 on studs 16 made fast in a relatively stationary part of the work holder. These cams may be identical in outline with the rotor to be produced, but preferably are made of larger diameter, for greater smoothness of action and accuracy of result.

The outline of the cam may be characterized for convenience of concise description as the radial equidistant of the rotor outline. The meaning of the term "radial equidistant" is explained with reference to Fig. 9, where the inner rotor and a part of the cam are shown in superposed coaxial projection. The broken lines O—M, O—N, O—P ... O—V are the projections of radial lines cutting the circumference of the cam at the points M, N, P ... V and the circumference of the rotor at the points $m, n, p \ldots v$. The distances M—$m$, N—$n$, P—$p$ ... V—$v$ are all equal; and the same thing is true as to the points on the two perimeters cut by any other radial line. That is, all points on one curve are radially equidistant from corresponding points on the other curve. By thus making the cam of larger outline than the rotor, its lobes and depressions are of larger radius and more gentle curvature than those of the rotor, whereby they give lateral movement to the work spindle smoothly when rotating at high speed. The outline of the cam is generated according to the principles described in my companion application, Serial No. 624,015, filed of even date herewith, so that the radially equidistant curve generated on a work piece of the size required for the rotor will be conjugate to the ring rotor. With the application of these principles cams may be made identical in outline with the required rotor, or larger or smaller in any desired measure, always with the quality of radial equidistance. The roller abutments 15 have a radius equal to that of the cutting tool by which the cam periphery is made, which of course is shorter than the shortest radius of concave curvature in the depressions between lobes of the cam. Such abutments are equal in number to the lobes of the outer rotor and are equiangularly spaced around a common center, and at such a distance therefrom as to maintain close engagement of all the abutments with the cam.

The work spindle is supported wholly by the cams. The abutment holding pins 16 for the two cams are mounted respectively in a sleeve 17 and a sleeve 18, these sleeves being gripped in bearing clamps 19 of a work holding stand 20. The sleeves 17 and 18 have central bores enough larger than the work spindle to permit the free orbital motion of the latter. A bearing 21 forms part of the work holding stand and is located between the sleeves 19. It holds rotatively a driving sleeve 22 on which is keyed or pinned a worm wheel 23 meshing with a driving worm 24, contained in a housing 25 and the shaft of which is supported by bearings at the end of the housing. Rotation is transmitted from the rotating driving sleeve 22 to the revolving spindle 11 through a coupling which consists of a ring 26 fast on the spindle and a floating ring 27 loosely surrounding the spindle between the ring 26 and the adjacent end of the drive sleeve. The floating ring 27, as shown best in Fig. 5, has diametrically opposite slots or notches 28 in one face to receive pins 29 projecting from the adjacent end of the drive sleeve, and other notches 30 in its opposite face, on a diameter at right angles to that of the notches 28, which receive pins 31 projecting from the ring 26. The bore of the floating ring is enough larger than the work spindle to permit orbital motion of the latter as compelled by the cam.

It will be understood that the drive sleeve 22 has rotary motion only, with no lateral translation. The cutting tool, or rather its limb nearest to the work spindle, is related to the axis of this sleeve in the same way that any one of the lobes e of the outer ring of the pump is related to the center of the ring; that is, the middle plane of the wheel is radial to this axis and the nearest point of its rim is at the same distance from the axis as the corresponding point in any lobe e from the center of the outer ring. The circular row of cam abutments 15 is centered on the same axis, but the cams are centered on the axis of the work spindle.

The conjoint action of the rotating drive sleeve and of the cams and their abutments is to rotate the work spindle at the same angular rate as the drive sleeve, and at the same time revolve it about the axis of the drive sleeve in an orbit of which the radius at the axis of the work spindle is equal to the eccentricity of the pump rotors $a$ and $b$, and at the rate of one revolution while the spindle rotates through the angle between corresponding points on two adjacent lobes. This motion of the work is equivalent to that of the inner rotor rolling at its pitch circle without slip on the pitch circle of the outer rotor, while the latter is held stationary. The action is graphically illustrated in Figs. 9-12, which show four different positions of the work while rotating through half the angular pitch of its lobes. In these figures, O designates the axis of the work spindle, and C the axis of the driving sleeve 22, corresponding to that of the pump rotor $b$; the the circle D represents the pitch circle of the inner rotor, and E the pitch circle of the outer rotor.

The cams are keyed and clamped on the work spindle in the manner shown in Fig. 1, or otherwise suitably, and between the cams and the adjacent ends of the abutment holders 17 and 18 are spacing rings 32 which serve as end thrust abutments for the spindle. A dust cap 33 is secured to a flange on the sleeve 17 to enclose one end of the spindle and the cam and abutments adjacent thereto, while a dust shield is provided for the other cam consisting of a cover 34 secured to the flange of sleeve 18, and a plate 35 tightly fitting on and secured to the spindle and overlapping the rim of the hole in the cover through which the spindle protrudes. A compressible packing ring 36 is confined between the overlapping parts of the plate and cover.

The grinding wheel and work holder may be supported, driven and adjusted in any desired way, means suitable for this purpose being known in the art. I have shown in Fig. 7 a conventional design of such means. In this figure, 37 represents a base or pedestal from which rises an upright 38 providing guideways for an adjustable carriage 39 in which the grinding wheel 12 is mounted. 40 represents a hand wheel or crank for adjusting the grinding wheel up and down. The work holding stand or bracket 20 is shown as affixed to a table 41 movable on the machine base in a direction parallel to the work spindle axis and having means by which it may be so moved through the medium of a hand wheel or crank 42. A motor 43 is indicated as having driving pulleys for driving the work spindle through a belt 44 and pulley 45, and for driving the grinding wheel through a belt 46 and pulley 47. Spring tension devices 48 and 49 take up the slack of the belts which are long enough to permit all the movement of the table necessary for feeding the work longitudinally past the wheel and for bringing the truing means into action.

The truing means above mentioned consist of a bracket or standard 50 on table 41 in which is rotatably mounted a shaft 51 carrying an angular arm or bracket 52. A diamond holder 53 is mounted on the arm for adjustment therein radially of shaft 51 so that the truing diamond 54 carried by its inner end may be placed at a distance from the axis of the shaft equal to the radius of the lobes of the outer rotor. The axis of shaft 51 is in the same plane with the axis of driving sleeve 22 and with the middle plane of the grinding wheel, and is set over from the driving sleeve axis toward the grinding wheel a distance equal to the distance of the center of a lobe of the outer pump ring from the center of the ring. This truing fixture is placed on the table at such a distance from the work holder as will bring it clear of the grinding wheel when the work is in position to be ground, but from which it can be brought into action on the grinding wheel by travel of the table. The manner in which the truing tool may be used to restore and maintain the correct transverse curvature of the wheel circumference is plainly shown in Fig. 8. Adjustable stops 55 and 56 are mounted on the truing tool support to arrest the arm and protect the diamond from injury through being pressed against the side of the grinding wheel.

In carrying out the complete process of producing the rotor pump units, of which this invention forms a part, the inner rotors are preferably first rough cut to near final size, but with a surplus of stock left to be removed by finish grinding. They may be thus rough cut in an ordinary milling machine by a formed milling cutter approximating the prescribed outline of one of the lobes or one of the spaces between two lobes. However, they can be generated out of the plain blank by a machine in all respects like that here described except in having a milling cutter instead of a grinding wheel as the cutting tool.

It has been found desirable in making such rotors for high speed operation to cut a clearance in the interlobal recesses between points located approximately as indicated by the letters $g$ and $h$, in each lobe; this in order to avoid the humming noise which has been noted when no such clearance is provided. In that case the formed roughing cutter is so made as to cut the clearances and leave stock only at and near the tips of the lobes to be removed by finish grinding; and the grinding wheel then actually finishes only those parts of the lobes. However, this is a detail arranged for a special purpose which does not affect the actual invention, and the grinding wheel or other tool may indeed act on the entire peripheral surface of the rotor.

The same principles may be equally well applied for producing machine elements and other articles of different forms than the rotor here illustrated, by appropriate modification of the cams, their supporting abutments, and the cutting tool.

What I claim and desire to secure by Letters Patent is:

1. A generating machine for finishing a rotor with external lobes conjugate to an enveloping ring rotor having regular lobes, all of equal convex circular curvature, when said rotors turn about axes eccentric to one another and the numbers of their respective lobes differ by one, comprising a rotatable cutting tool having its rim formed with the same convex profile as one of the lobes of the outer rotor, a work spindle extending transversely to the cutting tool, means for revolving the spindle bodily in an orbit of radius equal to the eccentricity of said rotors around an axis in the same plane with the middle plane of the cutting tool and passing the rim of the cutting tool at a distance therefrom equal to the distance of the center of the outer rotor from one of the lobes thereof, and means for simultaneously rotating the spindle about its own axis parallel to the before named axis at a speed such that it turns through the angle between corresponding points of two adjacent lobes of the work piece while making one complete revolution in its orbit.

2. A machine as set forth in claim 1 in which rotational torque is applied directly to the work spindle and the means for revolving the spindle in its orbit comprises a cam secured to the spindle and having an equal number of lobes with the work piece, and a series of rolls equal in number to the lobes of the outer rotor arranged in a circle about the said axis of revolution.

3. A rotor grinding machine comprising a work spindle, cams secured to said spindle having a regular series of lobes surrounding and equidistant from the axis of the spindle, a circular series of rolls mounted on fixed axes in a circle surrounding the spindle, the rolls engaging each cam being equidistant from a common center and their number differing by one from the number of lobes of the cam, means for rotating the spindle including a coupling having provisions for permitting lateral translative movement of the spindle in all directions, and a grinding wheel in position to cut the periphery of a work piece mounted on said spindle, such grinding wheel arranged with its axis transverse to the spindle and having a toric curvature at its rim.

4. In a machine for finishing rotors with a number of external lobes conjugate to a different number of internal lobes of a surrounding curve, comprising a cutting tool rotatably mounted and formed with a profile at its rim identical to one of the lobes of such surrounding curve, a supporting structure, a series of abutment rolls equal in number to the lobes of such surrounding curve mounted in a circle surrounding an axis which lies in the same plane with the middle zone of the cutting tool and passes the tool at a distance from its rim equal to the distance of the center of said surrounding curve from the nearest point of any of the lobes of such curve, a work spindle located within the circle of said abutments, a cam having a number of lobes equal to those of the work piece and of such dimensions as to make simultaneous peripheral contact with all the surrounding abutments, and means for rotating the spindle, including a flexible connection adapted to permit lateral translative movement of the spindle in all directions.

5. In a machine as and for the purpose indicated, a plurality of sleeves in axial alinement, one of which is rotatable and the adjacent one is stationary, means for imparting rotation to said rotatable sleeve, a series of roller abutments mounted on said fixed sleeve equally spaced around and equidistant from the axis of said sleeve, a work spindle of substantially smaller diameter than the bore of said sleeve extending through said bore, a cam on said spindle within the series, and engaging all, of said roller abutments and having a regular series of lobes differing in number by one from the number of said abutments, and a coupling between said rotatable sleeve and spindle consisting of a ring fast to the spindle, a floating ring surrounding the spindle between the first ring and the adjacent end of the sleeve, and diametrically opposite pins projecting from said ring and sleeve respectively into radial notches in opposite faces of the floating ring, the pins of one pair being on a diameter at right angles to those of the other pair.

6. In a machine of the character described, means for imparting simultaneous motions of rotation about its own axis and revolution about an eccentric axis to a work spindle, comprising a rotatable sleeve surrounding the spindle and having a bore at least as large as the diameter of the spindle plus twice the eccentricity of said axes, a bearing in which said sleeve is supported for rotation, means for rotating the sleeve, a flexible coupling organized to transmit rotation from the sleeve to the spindle while permitting translative movement thereof laterally in all directions, duplicate cams on the spindle at either side of said sleeve, said cams having external lobes and intermediate spaces, and abutments differing in number by one from the number of lobes of said cams in fixed location spaced equidistantly from and equiangularly about the axis of said sleeve, respectively engaging the periphery of both cams in all positions thereof.

7. In a machine for producing by generation a rotor having external lobes, a rotatable work spindle, a cam having a periphery which is a curve radially equidistant to the curve to be produced on the rotor, and rotor abutments in fixed position surrounding said cam and in simultaneous contact with its circumference, said abutments differing in number by one from the number of lobes of the cam.

8. The method of generating an externally lobed rotor conjugate to an enveloping curve having a different number of circularly curved lobes regularly spaced around a center eccentric to that of the rotor, which consists in generating cams having identical peripheries which are curves radially equidistant to the rotor curve to be generated, mounting said cams on the same spindle with the work piece to be finished and each in peripheral engagement with a surrounding series of equally spaced abutments having the same number and similar curvature to the internal lobes of said enveloping curves, driving said spindle rotatively, and acting on the work piece by means of a grinding wheel having the same profile as one of the lobes of the enveloping curve, and rotating so that its rim travels axially of the work spindle.

9. A machine as and for the purpose set forth, comprising a work holding stand, a work spindle, means on said stand for supporting said spindle with provision for rotating on its own axis and revolving about a parallel eccentric axis, a grinding wheel rotatable, in a plane containing the axis of such revolution, about its own axis perpendicular to said plane, and a truing tool for giving the grinding wheel a toric curvature at its rim, said truing tool being rotatably supported to rotate about an axis parallel to said axis of revolution in the aforesaid plane, between said axis of revolution and the grinding wheel, and at a distance from the axis of revolution.

10. A machine for generating a rotor conjugate to a ring rotor having a circular series of internal lobes of circular outline, comprising a rotatable work spindle and means for revolving said spindle in an orbit about an axis of revolution, a grinding wheel rotatably mounted in the same plane with the said axis of revolution and being wholly at one side of that axis, and a wheel truing tool rotatably supported to oscillate about an axis parallel to said axis of revolution in the aforesaid plane, the axis of the truing tool being spaced apart from said axis of revolution a distance equal to the distance of the center of any of said lobes from the center of the series of lobes, and the extremity of the truing tool being directed toward its axis of rotation and being at a distance therefrom equal to the radius of one of said lobes, whereby to impart a toric curvature to the rim of the grinding wheel with the same profile as the outline of such lobe.

11. The method of finishing a rotor having external lobes conjugate to the internal lobes of an enveloping ring rotor, which consists in shaping a cutting tool with a toric curvature in its rim identical in profile with the outline of the lobes of said enveloping rotor, revolving a work piece across the plane of said tool about an axis which is distant from the rim of the tool by an amount equal to the distance of the lobes of said enveloping rotor from the center of such rotor, and simultaneously rotating the work piece in the opposite direction about its own axis eccentric to said axis of revolution at a rate such that its lobes in adjacent succession are wiped around the rim of the tool from one side to the other thereof and are thereby given a smooth convex curvature at their outer extremities.

12. The method of cutting a rotor having external lobes, differing in number by one from, and conjugate to, the internal lobes of an enveloping ring rotor, which consists in shaping the circumference of a rotating cutting tool with a toric curvature identical in profile to the outline of the lobes of said enveloping rotor, rotating said tool about its axis, and passing the work piece across the rim of said tool with a compound movement composed of rotation about its own axis and revolution about an axis eccentric to its own axis by an amount equal to the prescribed eccentricity between the two rotors, at relative speeds such that the ratio of angular motion about its own axis to the angular motion about the axis of revolution is equal to the reciprocal of the number of lobes of the work piece; said axis of revolution being distant from the nearest point of the tool by an amount equal to the distance of the lobes of the enveloping rotor from the axis of that rotor.

WILLIAM H. NICHOLS.